US008314684B2

(12) United States Patent  (10) Patent No.: US 8,314,684 B2
Veni, III  (45) Date of Patent: Nov. 20, 2012

(54) SYSTEMS AND METHODS FOR AUTOMATICALLY PROGRAMMING PAGERS

(75) Inventor: Salvatore Veni, III, Suwanee, GA (US)

(73) Assignee: HME Wireless, Inc., Suwanne, GA (US)

( * ) Notice: Subject to any disclaimer, the term of this patent is extended or adjusted under 35 U.S.C. 154(b) by 0 days.

(21) Appl. No.: 13/450,007

(22) Filed: Apr. 18, 2012

(65) Prior Publication Data

US 2012/0200393 A1   Aug. 9, 2012

Related U.S. Application Data

(63) Continuation of application No. 12/113,097, filed on Apr. 30, 2008, now Pat. No. 8,174,359.

(51) Int. Cl.
*H04M 3/42* (2006.01)
*H04M 11/00* (2006.01)
*H02J 13/00* (2006.01)

(52) U.S. Cl. ........ 340/9.1; 340/9.16; 455/415; 455/419; 455/551

(58) Field of Classification Search .................. None
See application file for complete search history.

(56) References Cited

U.S. PATENT DOCUMENTS

| | | | |
|---|---|---|---|
| 4,849,750 A | 7/1989 | Andros et al. | |
| 5,416,827 A | 5/1995 | Gaskill | |
| 5,515,228 A | 5/1996 | Nakayama et al. | |
| 5,546,077 A | 8/1996 | Lipp et al. | |
| 6,173,157 B1 | 1/2001 | Godoroja et al. | |
| 6,346,890 B1* | 2/2002 | Bellin | 340/9.11 |
| 6,393,298 B1 | 5/2002 | Fulton | |
| 6,696,922 B1* | 2/2004 | Wong et al. | 340/7.32 |
| 6,920,318 B2 | 7/2005 | Brooking et al. | |
| 7,151,943 B2 | 12/2006 | Comer et al. | |
| 7,236,087 B2* | 6/2007 | Vasquez et al. | 340/311.2 |
| 7,242,951 B2* | 7/2007 | Helferich | 455/458 |
| 7,333,821 B2* | 2/2008 | Willey | 455/458 |
| 7,366,512 B1* | 4/2008 | Kefalas et al. | 455/435.2 |
| 7,385,479 B1 | 6/2008 | Green et al. | |
| 7,711,359 B2 | 5/2010 | Netanel et al. | |
| 7,778,594 B2* | 8/2010 | Childers et al. | 455/3.05 |
| 2002/0105412 A1* | 8/2002 | Carissimo | 340/7.39 |
| 2002/0137500 A1 | 9/2002 | Brooking et al. | |
| 2004/0249983 A1* | 12/2004 | Bedner | 709/249 |
| 2006/0017542 A1 | 1/2006 | Holloway et al. | |
| 2006/0258334 A1* | 11/2006 | Tarallo | 455/412.2 |
| 2007/0040652 A1 | 2/2007 | Quatro | |
| 2007/0191000 A1* | 8/2007 | Veni et al. | 455/426.1 |

\* cited by examiner

*Primary Examiner* — George Bugg
*Assistant Examiner* — Renee Dorsey
(74) *Attorney, Agent, or Firm* — Pillsbury Winthrop Shaw Pittman LLP

(57) ABSTRACT

Systems and methods for addressing pagers are described. The pagers are reprogrammable and can be assigned identifiers as required. Pagers may be automatically assigned one of a plurality of identifiers. Thereafter, the assigned identifier may form the basis of a unique network address that allows the pagers to communicate wirelessly with a network in order to receive information commands and pages. The assigned identifier is maintained on the pager and can be presented on a display for identification of the pager. The assigned identifier can be transmitted to the pager by a charging unit when the pager is connected to the charging unit and can be calculated using the location of a port at which the pager is connected to the charging unit.

17 Claims, 3 Drawing Sheets

SYSTEMS AND METHODS FOR AUTOMATICALLY PROGRAMMING PAGERS

RELATED APPLICATIONS

This application is a continuation of U.S. patent application Ser. No. 12/113,097, filed Apr. 30, 2008, which is hereby incorporated by referencing into the present application in its entirety.

BACKGROUND

1. Field of the Invention

The present invention relates generally to paging systems and more particularly to paging systems in which pagers are programmable.

2. Description of Related Art

Conventional pagers are generally hard-coded with an ID number and manually labeled in accordance with the ID number. Pagers that are used in the customer service arena are often provided on a temporary basis to clients to notify clients when their time for service has arrived. For example, restaurants may use pagers to notify customers when a table is ready for seating and the pagers may take the form of a coaster or may have any other desired shape. Locations will typically purchase 40 or 50 pagers or coasters to support their operations. When a pager becomes lost or stolen, reordering must be coordinated with current inventory in order that the ordering of replacement pagers does not result in the duplication of pager ID numbers. Shipping costs and labor resources may contribute to the problem.

Some currently available pagers can be reprogrammed on site. Generally, reprogramming is a manual process and may involve steps of setting switch positions and labeling the pager. While reprogrammable pagers resolve some of the basic problems with pagers, many issues remain. For example, those prior art systems that permit reprogramming require manual reprogramming of each individual pager, resulting in a tedious, time-consuming process. Furthermore, management of an inventory of conventional reprogrammable pagers is often associated with increased labor costs. Likewise, labeling of pagers to match a new pager ID includes additional labor-intensive, tedious work.

BRIEF SUMMARY OF THE INVENTION

Certain embodiments of the present invention comprise systems and methods for addressing one or more pagers whereby the pagers can be identified by reprogrammable identifiers. Pagers may be automatically assigned one of a plurality of identifiers and the assigned identifier may be maintained on the pagers. Subsequently, the pagers can communicate wirelessly with a network in order to receive information commands and pages.

In some embodiments, an identifier is assigned to a pager wherein the identifier comprises a pager number for display on the pager. The assigned identifier can be transmitted to the pager by a charging unit when the pager is connected to the charging unit. The assigned identifier can be selected from a plurality of identifiers and can be calculated using the location of a port at which the pager is connected to the charging unit. The assigned identifier may be associated with a Channel Access Protocol Code used for addressing the pager and the pager can be addressed using the Channel Access Protocol Code. The Channel Access Protocol Code may be generated or otherwise derived from the assigned identifier.

In some embodiments, commands may be communicated to the pager, the one or more commands including a command causing the pager to alert a user of the pager. Other information can be communicated to the pager, the information including an anticipated wait time, menu information and other diversionary information such as information related to games, quizzes and news. Typically, assigning and transmitting identifiers for plural devices can be performed concurrently and these functions may be performed in response to an operator command or upon detection and/or occurrence of an event identified by a predefined schedule.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Figure 1:
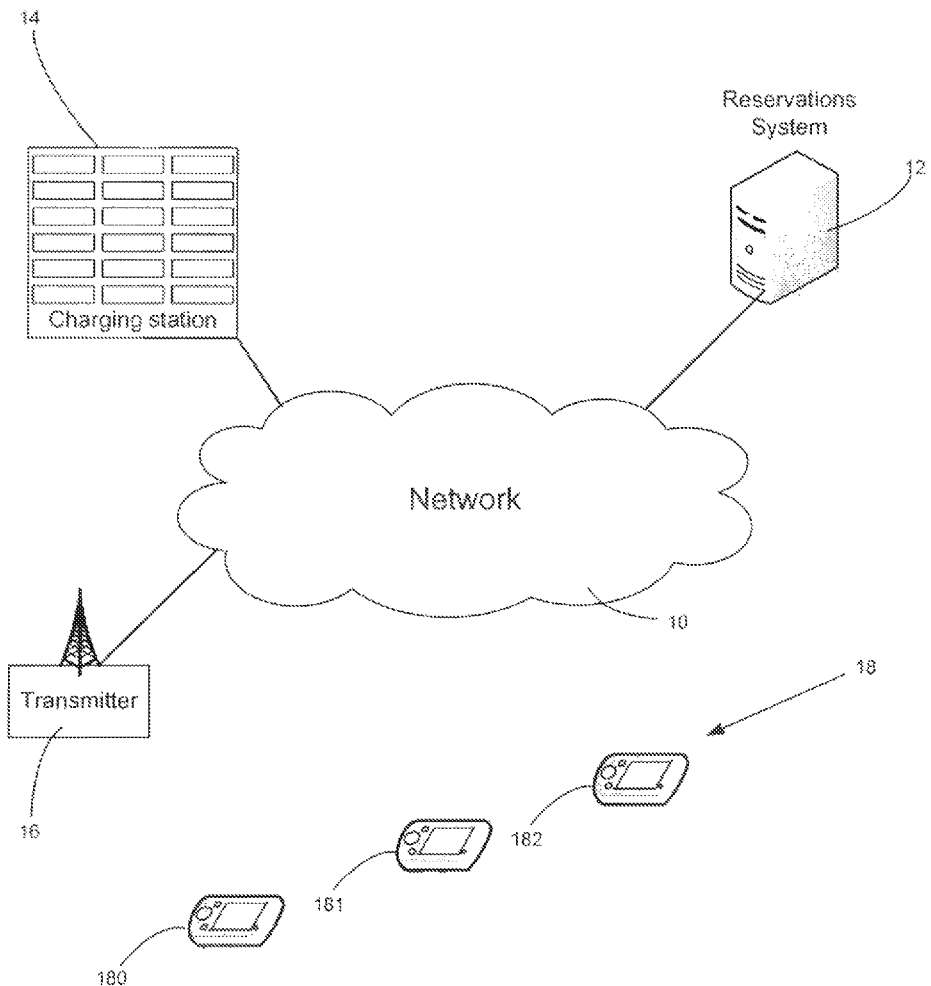
FIG. 1 is a diagram illustrating a simplified example of an embodiment according to certain aspects of the present invention.

Certain embodiments of the invention provide systems and methods for maintaining a plurality of paging devices. The plurality of paging devices can include wireless devices configured to receive signals and messages from a central system. In the example depicted in FIG. 1, the central system may comprise a controller or server such as the depicted reservations system 12 that can be used in support of various customer service applications. In the example, the customer service applications may include a restaurant management system configured to manage table and server assignments, to track table status and to maintain a queue identifying patrons awaiting service. Transmitter 16 can receive instructions, messages and other information from reservations system 12, which instructions may include information and commands to be transmitted to one or more paging devices 18. Transmitter 16 may, for example, relay commands to a paging device 180, 181 or 182 that causes the paging device 180, 181 or 182 to alert a user of the paging device 180, 181 or 182. In another example, the relayed commands may cause transmitter 16 to request paging device 180, 181 or 182 to provide updated status such that status of all paging devices 18 can be maintained. In another example, the command may be sent to determine which of pagers 18 are currently within communication range of transmitter 16 by causing each of the paging devices 18 to generate a signal visible and/or audible signal or, if pagers 18 are suitable equipped, to send a response to the transmitter 16. Status of paging devices 18 may be based on events observable at charger 14 and/or transmitter 16 including for example, detection of presence of paging devices 18 when communicating with transmitter 16 or docked in charger 14. Furthermore, certain paging devices 18 may be equipped with transmission capabilities enabling two way communication of status information between paging devices 18 and transmitter 16.

In certain embodiments, messages may be passed between transmitter 16 and paging devices 18. Messages can include keys, serial numbers, seed values and other information that permit unique identifiers to be created independently at the transmitter 16, reservations system 12 and paging devices 18. Messages can include updated status information of interest to a user of a paging device 180, 181 or 182. In the example of a restaurant management system, the message may comprise updated status information indicating the availability of a requested table, a pre-warning of availability and/or a request to report for seating when a requested table becomes available. Other information can include information providing news, advertisements, menus, games and other distractions calculated to entertain customers awaiting seating.

In certain embodiments, paging devices 18 are provided to customers requesting service, typically upon arrival at the restaurant. Paging devices 180, 181 and 182 will typically be uniquely identified within a reservations management system 12. Identification of paging device 180, 181 or 182 may include a serial number, a system identifier (e.g. transmitter 16 identity) and a pager number assigned to the paging device 180, 181 or 182. In certain embodiments, paging device 180, 181 or 182 may comprise a programmable device in which the assigned pager number is stored. This pager number may be used as a primary identifier of the corresponding paging device 180, 181 or 182 in order to facilitate reconfiguration of the reservations system 12 and/or transmitter 16 and to ease of replacement of a lost paging device 180, 181 or 182. Replacement of a paging device 180, 181 or 182 may be required because of impairment, misplacement or removal by customers or other persons. The use of a programmable identifier allows the reconfiguration and re-sequencing of paging devices 18 and can simplify ordering of replacement paging devices 18. Programmable identifiers may be stored on the pager while updating software and/or configuration information.

In one example, a periodic update of all paging devices 18 may cause all paging devices 18 to reset their system identification numbers based on information received from the transmitter 16. In certain embodiments, charger 14 may generate or relay information causing paging devices 18 to reset their system identification number. New identification numbers or data may be allocated based on physical location of a paging device 18 in a charger 14. New identification numbers may be assigned based on received unique identifiers such as serial numbers provided by the paging devices 18; assignment may also be made at random or may be made based on predetermined rules.

In another example, charger 14 may be configured to automatically program paging devices 18 in response to an instruction received from reservations system 12, transmitter 16 and/or charger 14 in accordance with a predefined renumbering scheme or schedule. The predefined schedule may include indications of a specified scheduled time day and/or date for programming, a window of time during which programming may be initiated and time intervals between programming. A predefined numbering scheme may be employed. For example, the scheme can include a simple sequential numbering of paging devices 18 found to be present in the charger 14 whereby each slot in the charger 14 is assigned one or more numbers that can be programmed into any pager 180, 181 or 182 inserted into the slot.

In certain embodiments, pager 180, 181 or 182 and any of charger 14, transmitter 16 and reservations system 12 may be configured to independently generate a unique identifier for the pager 180, 181 or 182. Typically, unique pager serial number, network address and/or a seed value is shared between the pager 180, 181 or 182 and the charger 14, transmitter 16 and reservations system 12 whereby the seed value is processed according to a predefined algorithm in order to obtain a unique identifier for the pager 180, 181 or 182. In this manner, the unique identifier need not be transmitted to the pager 180, 181 or 182. In one example, pager 180 may provide its serial number to the charging unit when docked, or if desired, wirelessly to any of charger 14, transmitter 16 and reservations system 12. A seed value, known to both pager 180 and the charger 14, transmitter 16 or reservations system 12, may be used together with the serial number—or a portion of the serial number—to generate a unique identifier. The seed number may be associated with the system and/or a transmitter 16 of the system. In certain embodiments, no seed value is required and a serial number or other device address stored in the pager can be used to generate a unique identifier.

In certain embodiments, renumbering may also be performed using wireless communication with the transmitter 16. In one embodiment, a switch, button or other control, such as a computer generated control, may be activated by a restaurant employee each day prior to commencement of business operations, prior to beginning of a shift or when a wait list is opened. In one example, all pagers present in a charger 14 are renumbered when an employee activates a renumbering control or switch provided, for example, on charger 14 or on a remote control (not shown) or other device. Renumbering control or switch may be provided in a user interface displayed on a computing device in communication with the reservations system 12, charger 14 and/or transmitter 16.

It will be appreciated that certain aspects of the invention enable missing pagers 18 to be easily and economically replaced. For example, cost of production of pagers 18 can be significantly reduced because each pager 180, 181 and 182 need not be preprogrammed with a unique identifier. Where identifiers are communicated based on location within a charger 14, all paging devices 18 may initially be programmed to a neutral or null value. The reservations system 12 may then track identifier allocation and provide new identifiers to newly added devices as they are charged in the charger 14. Moreover, little or no user intervention is required to bring new paging devices into service. A staff member need only insert a new paging device 180, 181 or 182 into a charger 14 to activate and uniquely identify the new paging device 180, 181 or 182. Consequently, extra pagers may be stored in inventory indefinitely and added to the system as needed. In the above-described example of daily reprogramming, paging devices 180, 181 and 182 will typically have an unbroken sequence of numbers that facilitates tracking of customer wait queues. It is contemplated that some applications may benefit from reprogramming devices 180, 181 and 182 prior to each use in order to match wait list numbers provided by a reservations system 12. In the latter example, the reservations system 12 can indicate by signal lamp, or otherwise, the location of the next pager to be used 180, 181 or 182. The next pager to be used 180, 181 or 182 can be selected based on charge status, design and other factors and the next paging device 180, 181 or 182 may be programmed with a next in sequence wait list number.

It will be further appreciated that aspects of the present invention permit bulk purchasing and centralized inventory management of paging devices 18 in order to reduce costs associated with device replacement. Thus, large enterprises, franchises and/or chains can buy replacement paging devices 18 in bulk and can service individual restaurants from their commissary system. For example, a restaurant manager need not place an order for a specific pager number (e.g. a #6 pager) but may instead order a pager that may be automatically programmed. Moreover, certain aspects of the present invention provide pagers with limited "intelligence," smart chargers 14 and/or charging systems. This feature shifts significant portions of the expense of the system to the fixed-in-place and controlled charging system from the mobile paging devices 18 that are susceptible to loss.

Figure 2:
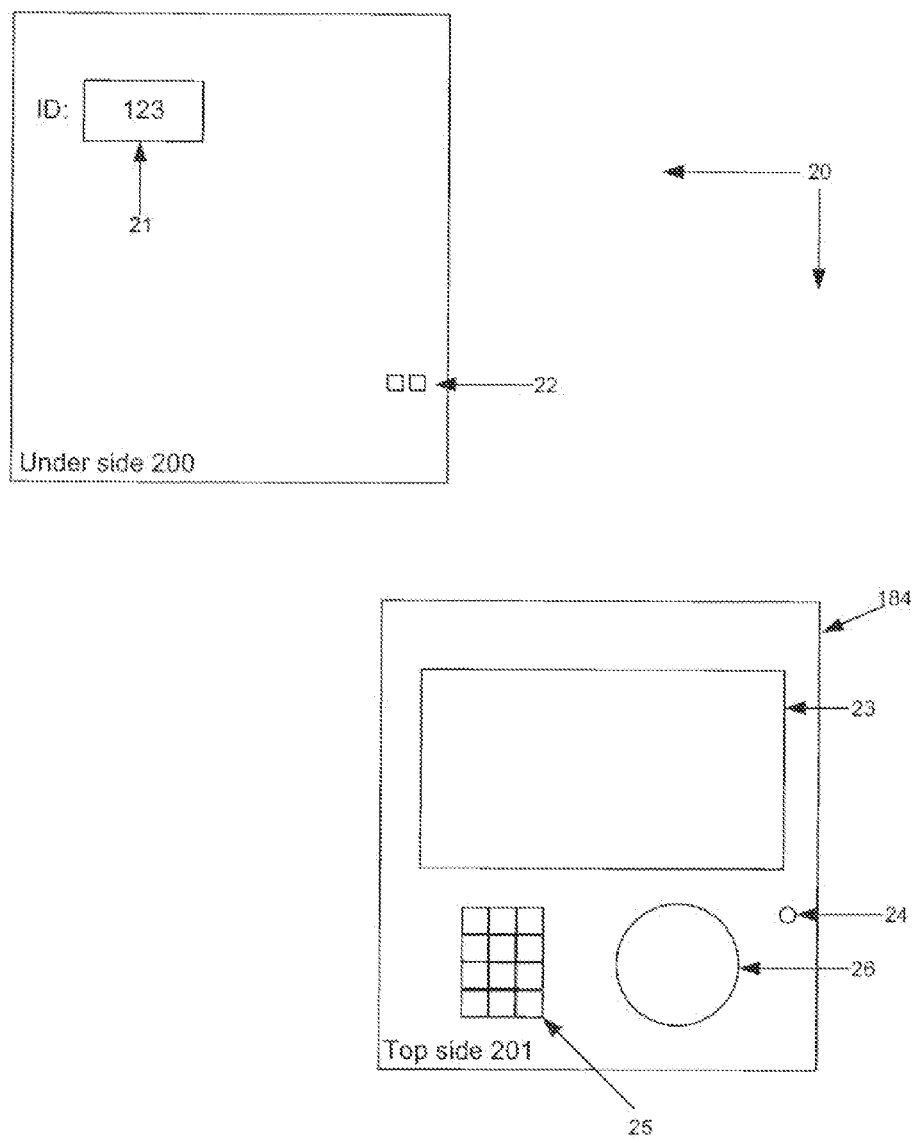
FIG. 2 is a block diagram illustrating a pager according to certain aspects of the present invention.

Referring now to FIG. 2, certain embodiments comprise a plurality of paging devices, each paging device 20 being provided with a display 21 for presenting information that includes programmed pager identifiers. In certain embodiments, paging devices may take the form of traditional pagers, coasters, game controllers, data entry devices and can assume any desired form factor. In one example, a liquid crystal display ("LCD") 21 displays a numeric or alphanumeric indication of the programmed pager identifier. Controls 22 may be provided to allow access to additional information on display 21, to reset pager 20 and for other purposes. In certain embodiments, display 21 and controls 22 are deployed on the underside 200 of pager 20. However, display 20 may also be provided on the topside 201 of pager 20, particularly if used for displaying other information such as identification of the transmitter 16, reservations system 12, status, error codes and so on to users.

In certain embodiments, pager 20 comprises sufficient storage to maintain identifiers and network addresses. Storage may include a media and/or non-volatile memory encoded with programs, instructions and configuration data for controlling operation of pager 20. In some embodiments, pager 20 may be equipped with a processor or sequencer to support programmed operations that can include generation of unique identifiers, storage of identifiers, communication with transmitter, communication with charger 14 and the receipt and processing of program updates. In at least some embodiments, processors are provided that can support complex user interaction enabling the provision of scrollable text and images and participation in collaborative activities including games and quizzes.

In certain embodiments, an enlarged display 23 may be used to display a variety of information and media to customers. For example, graphical display 23 may facilitate customer access to menu, advertisements, wait status and other information. Graphical display 23 may additionally be used together with a keyboard 25 for interactive applications including games and network browsing. Furthermore, certain embodiments may provide audio output through a loudspeaker 26.

In certain embodiments, pager 20 may display system information such as configuration, network and device-specific information on an available display 21 and 23 of pager 20. System information may include a pager number, a pager base ID or system ID, warranty-related information such as date of inception of the pager 20. The pager 20 may also display pager status such as alert mode, form of alert, battery charge and signal strength. Display of system and status information may be provided upon receipt of command by pager 20 from a system controller such as transmitter 16 or any computing device in communication with the transmitter 18. Display of system and status information may also be provided upon activation of a switch or other control at the pager 20. Certain elements of the system and status information may be displayed at all times and certain elements may be periodically displayed or displayed in certain conditions. In one example, signal strength may be always indicated. In another example, a warning may be displayed when signal strength drops below a predefined threshold value. In many embodiments, a pager number is prominently displayed such that a customer may be easily alerted by conventional means if the pager 20 fails to communicate an electronic alert.

In certain embodiments, paging functionality of pager 20 is typically supported using one or more lamps 24, such as LED lamps, vibration and audible signals. For example, pager 20 may alert a person or a group of persons using flashing lights, an audible signal, a prerecorded or transmitted voice, vibration or by any combination of alert mechanisms. A typical pager 20 comprises an RF receiver or transceiver and a processor board. In one example, the RF receiver may comprise a super heterodyne receiver configured to receive a signal from transmitter 16. Super heterodyne receivers have superior characteristics to simpler receiver types with regard to frequency stability and selectivity. In another example, a WiFi transceiver may be employed, thereby enabling bidirectional communications. The processor may decode data obtained from the received signal to provide information in a readable output form (e.g. numeric or alphanumeric) and/or to initiate an alert including a tone, flashing lights, vibration and so on.

In one embodiment, pager 20 includes a 3-digit, 7-segment display 21 that shows a number assigned to the pager 20. Each pager number typically corresponds to a unique ID or Channel Access Protocol (CAP) code ("Capcode") associated with the pager 20. A Capcode is typically preprogrammed on a pager 20. When the pager receives the Capcode from the transmitter, it alerts the user and may provide additional information, depending on the pager type. In one example, a Capcode comprises a Base ID (3 digits) and a Pager ID (4 digits). Capcodes can be programmed or otherwise stored on pager 20 using a personal computer or other device, a charging unit and/or an over-the-air (OTA) wireless protocol. Typically, pager 20 initially ships with a customer base ID preprogrammed. Pager 20 can include one or more rechargeable batteries that may be charged through charging pins, connectors or other contacting mechanism. Contacting mechanism connects with corresponding contacts in a charger 14. In one example, two pins are used to charge the batteries and other pins can be used for data transfer of Capcode and other information from the charger 14 to the pager 20.

Figure 3:
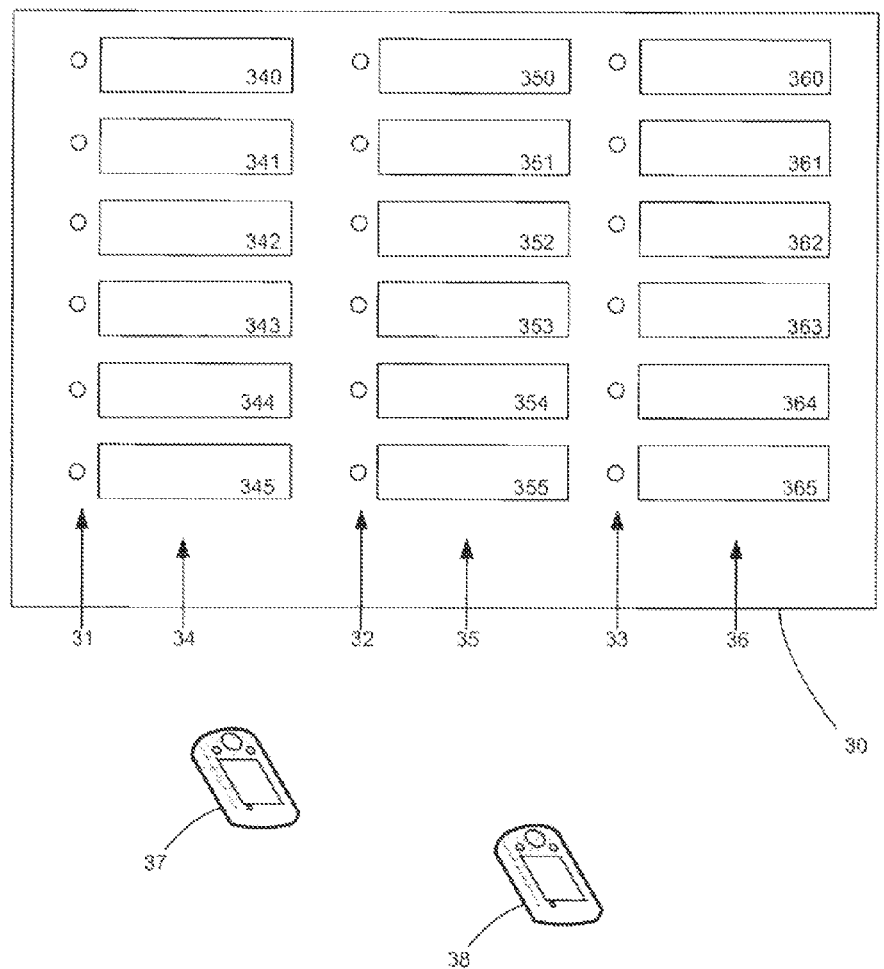
FIG. 3 is a block diagram illustrating a smart charger according to certain aspects of the present invention.

Referring now to FIG. 3, certain embodiments of the invention provide a smart charging system 30 that comprises at least one stack 34-36 of ports 340-345, 350-355 and 360-365. Each port can charge and communicate with a suitably provisioned paging device 37. Each port is typically assigned a unique ID and each stack 34, 35 and 36 can be associated with a unique identifier. Thus, each port may have a unique identifier that corresponds to a charging system 30, a stack 34, 35 and 36 and port 340-345, 350-355 or 360-365. When a paging device 37 is inserted into a slot of a port, in one example the slot of port 353, and a programming function is activated, the paging device 37 will typically be reprogrammed to maintain an ID associated with port 353. Previously stored port information can be deleted and replaced by the reprogrammed port information. In certain embodiments, and as described above, reprogramming can be initiated in accordance with a predefined schedule or by user activation.

In certain embodiments, reprogramming can permit more than one paging device 37 to be programmed at different times at a single port 340-345, 350-355 or 360-365. For example, an unprogrammed device may be inserted into slot 341, which slot had previously programmed a different paging device 38. The charging system 30 may determine device 37 remains in contact and active with transmitter 16 and may assign a different address to paging device 38. Alternatively, charging system 30 may program device 38 regardless of the status of device 37 according to preconfigured rules. In some embodiments, a smart charger 30 may be provided that can handle sequential programming of multiple devices. For example, the smart charger may program a first batch of devices to a first sequence of identifiers—e.g. 1-18—after which programming a command may be received to change the identifier for each slot to 19-36 so that a second batch of paging devices can be programmed. It will be appreciated that the process of programming of device identifiers may include manual intervention whereby an operator may selectively activate programming function for one or more devices and/ or may select an available identifier to be programmed in an individual device 37 or 38.

It is contemplated that certain embodiments may dynamically assign device identifiers to ports 340-345, 350-355 to allow asynchronous or batch programming of paging devices. For example, an 18-port smart programmer 30 may be initially assigned addresses 1-18 which will be assigned to the first 18 paging devices inserted into the charging system 30. After the 18 addresses have been assigned, the charging system 30 may then assign addresses 19-36 to the next 18 paging devices. This assignment process is typically used for batch programming of devices. In certain embodiments, assignment of device identifiers may be performed sequentially, whereby the initial identifiers available to the charging system 30 may be updated automatically after each device is programmed. Thus, a device placed in the charging system 30 can be assigned the next available identifier. It is contemplated that, in at least some embodiments, ranges of identifiers can be provided to each port 340-345, 350-355 and 360-365 in a charging system 30 such that the next identifier assigned at each port 340-345, 350-355 or 360-365 is determined in part by the number of devices previously programmed at the port 340-345, 350-355 or 360-365. For example, allocation and programming of an address may be indicated only when a paging device is inserted with a null or old/aged address. In that regard, an address may include a time sensitive portion such as a day of programming (e.g. 1-7) that can be used to indicate aging of the identifier, thereby indicating that the device should be reprogrammed. In one example, an aged identifier may be converted to a null or invalid value.

As discussed above, certain embodiments of the invention may be used in a variety of applications. The food services industry has been identified above as one example of an application. Restaurant owners can use the described systems to notify their customers that their table is ready. Pagers are given to patrons as they arrive for service in order to permit the patrons to wait in a nearby reception area, in a bar or even outside the facility. Once a customer's table is ready, a staff member can cause a system server to page the customer by sending information to the transmitter, which then sends a signal to the pager which causes an alert, such as flashing lights, to occur. The restaurant owner must have a sufficient number of pagers available to meet the demands of the restaurants customers. The pagers are mobile devices, operated under battery power, thus requiring a charger unit.

In one example, a charging system 30 supporting 30 slots for recharging pagers can optionally be daisy-chained with one or more other chargers (not shown) to enable charging of a larger number of pagers from a single power supply and/or using a common base ID code. The number of chargers that can be combined is typically limited by available current for charging and the number of IDs available. Each slot has a specific ID number that is changeable depending on a pager number range programmed into the charger. The charger may be provided with an LCD display and programming buttons and/or a keypad to set and program the charger 30 and pagers. Individual indicators 31, 32 and 33 may be provided to indicate charging status. The charger 30 may include processors and electronics for charging pagers, acquiring user input, displaying user output, making logic decisions and controlling programming of pagers.

ADDITIONAL DESCRIPTIONS OF CERTAIN ASPECTS OF THE INVENTION

Certain embodiments of the invention provide systems and methods for addressing one or more pagers. In some of these embodiments, methods comprise automatically assigning one of a plurality of identifiers to a pager, transmitting the assigned identifier to the pager for storage at the pager and communicating wirelessly with the pager wherein communicating includes addressing the pager based on the assigned identifier. In some of these embodiments, the assigned identifier comprises a pager number for display on the pager. In some of these embodiments, the assigned identifier is transmitted to the pager by a charging unit when the pager is connected to the charging unit. In some of these embodiments, the assigned identifier is selected from the plurality of identifiers based on the location of a port at which the pager is connected to the charging unit. In some of these embodiments, the assigned identifier is associated with a Channel Access Protocol Code used for addressing the pager. In some of these embodiments, the pager is addressed using a Channel Access Protocol Code generated from the assigned identifier. In some of these embodiments, communicating wirelessly with the pager includes transmitting one or more commands to the pager. In some of these embodiments, the one or more commands includes a command causing the pager to alert a user of the pager. In some of these embodiments, communicating wirelessly with the pager includes transmitting information to the pager, the information including an anticipated wait time. In some of these embodiments, the steps of automatically assigning and transmitting are performed concurrently for all of the plurality of pagers. In some of these embodiments, the steps of automatically assigning and transmitting are performed in response to an operator command. In some of these embodiments, the steps of automatically assigning and transmitting are performed upon occurrence of an event identified by a predefined schedule.

Certain embodiments of the invention provide a method for addressing a plurality of pagers. Some of these embodiments comprise, for each pager, receiving an indication of insertion of the pager into a slot of a charging system, generating a unique address for the pager, the unique address comprising an identification of the charging system and the slot and programming the pager with the unique address, wherein the unique address is different from addresses generated for the other pagers. In some of these embodiments, the unique address further comprises a device identifier provided by the pager. In some of these embodiments, the device identifier is a Channel Access Protocol Code. Some of these embodiments further comprise associating the unique address with the Channel Access Protocol Code. In some of these embodiments, the unique address includes a pager number selected from a sequence of pager numbers associated with the charging unit. In some of these embodiments, the generating and programming steps are performed for each pager after an event identified by a predefined schedule. Some of these embodiments further comprise charging each pager, wherein the generating and programming steps are performed for each pager upon a command provided to the charger.

Certain embodiments of the invention provide pager management systems and reservation systems. Some of these embodiments comprise a charger having ports, each port configured to receive a programmable pager, a plurality of pagers, each pager being uniquely identified by a network identifier and including storage for maintaining a pager identifier and a processor for generating pager identifiers for the plurality of pagers, wherein each pager identifier corresponds to a port that provides the each pager identifier to a pager charged in the port.

Certain embodiments provide systems and methods for addressing pagers. The pagers are reprogrammable and can be assigned identifiers as required. Pagers may be automatically assigned one of a plurality of identifiers. Thereafter, the assigned identifier may form the basis of a unique network address that allows the pagers to communicate wirelessly with a network in order to receive information commands and pages. The assigned identifier is maintained on the pager and can be presented on a display for identification of the pager. The assigned identifier can be transmitted to the pager by a charging unit when the pager is connected to the charging unit and can be calculated using the location of a port at which the pager is connected to the charging unit.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A pager configured for use in a service environment to page a patron waiting for service, the pager comprising:
    a rechargeable power supply;
    a contacting mechanism configured to electrically couple with a charger station to receive (i) power from the charger station to recharge the power supply, and (ii) wired control communication;
    non-transient electronic storage media storing a first identifier for the pager;
    a wireless transmitter configured to facilitate wireless communication between the pager and a wireless network;
    one or more processors configured:
        to transmit and receive wireless communication with the wireless network through the wireless transmitter at a first unique address that corresponds to the first identifier;
        to receive, through the contacting mechanism, information indicating a second identifier;
        responsive to reception of the information indicating the second identifier, to store the first identifier in the electronic storage media; and
        subsequent to storage of the second identifier in the electronic storage, to transmit and receive wireless communication with the wireless network through the wireless transmitter at a second unique address that corresponds to the second identifier, the second unique address being different from the first unique address.

2. The pager of claim 1, wherein the contacting mechanism comprises:
    one or more electrical contacts configured to receive power from the charger station to recharge the power supply; and
    one or more electrical contacts configured to receive wired control communication.

3. The pager of claim 1, further comprising an electronic display, wherein the one or more processors are further configured:
    to present the first identifier on the electronic display; and
    responsive to storage of the second identifier in the electronic storage, to present the second identifier on the electronic display.

4. The pager of claim 1, wherein the one or more processors are further configured to determine the second unique network address from the second identifier.

5. The pager of claim 4, wherein the one or more processors are further configured to determine the second unique network address from the second identifier based on a predetermined algorithm.

6. The pager of claim 5, wherein the predetermined algorithm uses as an input, in addition to the second unique network address, a separate, fixed identifier associated with the pager.

7. The pager of claim 1, further comprising a sensory interface device, and wherein the one or more processors are further configured such that, responsive to reception of a corresponding communication from the wireless network, a sensory stimulus is generated by the sensory interface device to page the patron.

8. The pager of claim 1, wherein the sensory interface device comprises one or more of a light, an electronic display, or a speaker.

9. The pager of claim 8, wherein the one or more processor are configured such that storage of the second identifier to the electronic storage media replaces the first identifier with the second identifier.

10. A method of programming a pager configured for use in a service environment to page a patron waiting for service, the pager comprising a rechargeable power supply, a contacting mechanism, non-transient electronic storage media, a wireless transmitter, and one or more processors, the method comprising:
    storing a first identifier for the pager in the electronic storage media;
    communicating with a wireless network through the wireless transmitter at a first unique address that corresponds to the first identifier;
    electrically coupling the pager with a charging station through the contacting mechanism;
    receiving power to recharge the power supply through the contacting mechanism;
    receiving, through the contacting mechanism, information indicating a second identifier;
    responsive to reception of the second identifier, storing the second identifier to the electronic storage media; and
    subsequent to the storage of the second identifier to the electronic storage media, communicating with the wireless network through the wireless transmitter at a second unique address that corresponds to the second identifier.

11. The method of claim 10, wherein the contacting mechanism comprises:
   one or more electrical contacts configured to receive power from the charger station to recharge the power supply; and
   one or more electrical contacts configured to receive wired control communication.

12. The method of claim 10, further comprising:
   presenting the first identifier on an electronic display of the pager; and
   responsive to storage of the second identifier in the electronic storage, presenting the second identifier on the electronic display.

13. The method of claim 10, further comprising determining, by the one or more processors, the second unique network address from the second identifier.

14. The method of claim 13, wherein the determination of the second unique network address from the second identifier is based on a predetermined algorithm.

15. The method of claim 14, wherein the predetermined algorithm uses as an input, in addition to the second unique network address, a separate, fixed identifier associated with the pager.

16. The method of claim 10, further comprising, responsive to reception of a corresponding communication from the wireless network, generating a sensory stimulus to page the patron, wherein the sensory stimulus is generated by a sensory interface device associated with the pager.

17. The method of claim 16, wherein the sensory interface device comprises one or more of a light, an electronic display, or a speaker.

* * * * *